(12) United States Patent
Honma

(10) Patent No.: US 6,433,812 B1
(45) Date of Patent: Aug. 13, 2002

(54) IMAGE OUTPUT APPARATUS AND METHOD OF CONTROLLING SAME

(75) Inventor: Koichi Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,045

(22) Filed: Jul. 10, 2000

(30) Foreign Application Priority Data

Jul. 23, 1999 (JP) ............................................ 11-209778
Jan. 13, 2000 (JP) ........................................ 2000-004758

(51) Int. Cl.⁷ .............................................. B41J 27/00
(52) U.S. Cl. ...................................... 347/261; 347/243
(58) Field of Search .................................. 347/139, 234, 347/243, 248, 259, 260, 261, 262, 264, 134; 399/77

(56) References Cited

U.S. PATENT DOCUMENTS 5,455,603 A * 10/1995 Hori et al. ................... 347/139
5,883,659 A * 3/1999 Serizawa et al. ........... 347/260

* cited by examiner

*Primary Examiner*—Hai Pham
(74) *Attorney, Agent, or Firm*—Fitzpatrick, Cella, Harper & Scinto

(57) ABSTRACT

When a printer receives print data in the form of PDL, commands are analyzed and intermediate data is stored in a page buffer (102). Rotation of a polygon mirror is started at this time by a scanner pre-rotation command unit (107), after which bitmap data is expanded by a bitmap expanding processing unit (103) and printed. When printing starts, the polygon mirror is already rotating. This makes it possible to shorten first-page discharge time.

18 Claims, 17 Drawing Sheets

IMAGE OUTPUT APPARATUS AND METHOD OF CONTROLLING SAME

FIELD OF THE INVENTION

This invention relates to an image output apparatus such as a printer connected to a host computer or the like, to a method of controlling the apparatus and to a storage medium for implementing this control method.

BACKGROUND OF THE INVENTION

In the prior art, an image output apparatus, e.g., a printer such as a well-known laser printer, is connected to a host computer using a standard interface cable and includes a controller for interpreting an image signal described in page description language (PDL) entered from the host computer and for expanding the image signal into bitmap data, and an engine for converting the bitmap data expanded by the controller to a video signal and for printing the video signal on printing paper using an electrophotographic process.

The controller instructs the engine to start printing when the creation of one page of page data has been completed or when the expansion of one page of bitmap data has been completed. Upon receiving the command to print, the engine rotates an accompanying rotatable polygon mirror and transports the printing paper at the moment the polygon mirror has attained the prescribed rotational speed.

Modern printers are required to print at higher speeds. What is sought in particular is reduced processing time from the moment printing starts at the host computer to the moment the first page is discharged from the printer. This processing time is referred to as "first-page discharge time".

There is also great demand for high image quality. To meet this demand, printers having multiple resolutions (600 dpi, 1200 dpi, etc.) are available. A shorter first-page discharge time is required in these multiple-resolution printers as well.

An alternative method of shortening first-page discharge time is to transport the printing paper up to a point just short of the printing position in advance of printing. Such a function is referred to as a "preliminary-feed function". A printer having the preliminary-feed function is required to have an even shorter first-page discharge time.

According to the prior art, however, the polygon mirror is caused to rotate after the printer engine receives the print start command. As a consequence, it takes time for the polygon mirror to attain the stipulated rotational speed. In particular, as resolution rises and printing speed increases, there is greater need to rotate the polygon mirror at higher speed and, hence, it takes longer for the mirror to attain the stipulated rotational speed.

SUMMARY OF THE INVENTION

Accordingly, an object of the present invention is to provide an image output apparatus and method of controlling the same, wherein by causing the polygon mirror to rotate before the engine receives the print start signal, the first-page discharge time can be shortened even if printing is performed at a high resolution or high printing speed.

According to the present invention, the foregoing object is attained by providing an image output apparatus comprising: an image-information development unit for converting one page of page data to a video signal after print information has been analyzed and the one page of page data created; an image formation unit for transporting a print medium in sync with the video signal from the image-information expansion unit and forming an image on the print medium through an electrophotographic process by causing scanning of a beam, which has been modulated by the video signal, by a rotatable polygon mirror; and polygon-mirror rotation command means for causing the polygon mirror to rotate when creation of the page data starts.

The apparatus preferably further comprises: stopping means for stopping the rotating polygon mirror; first detection means for detecting whether a fixed period of time has elapsed from issuance of the polygon-mirror rotation command; and second detection means for detecting whether processing for transporting the print medium is being executed; wherein the rotating polygon mirror is stopped by the stopping means if the fixed period of time has elapsed from start of rotation of the polygon mirror and, moreover, processing for transporting the print medium is not being executed.

The apparatus preferably further comprises third detection means for detecting whether the print medium is being transported, wherein the polygon mirror is not rotated by the polygon-mirror command rotation means if the print medium is being transported.

The apparatus preferably further comprises fourth detection means for detecting whether created page data exists, wherein the polygon mirror is not rotated by the polygon-mirror rotation command means if at least one page of the page data exists.

The apparatus preferably further comprises stopping means for stopping the rotating polygon mirror; changing means for changing resolution of an image formed by said image forming means; and fifth detection means for detecting whether the resolution of the engine has been changed; wherein the rotating polygon mirror is stopped by the stopping means if the resolution of the engine is changed.

The apparatus preferably further comprises means for performing preliminary feed to transport the print medium in advance to a stage prior to printing when an image is printed on the print medium based upon image information that has been entered from an information processing unit, wherein the preliminary feed is not performed if resolution of the engine is changed by the changing means.

In a preferred embodiment, the changing means changes transport speed of the engine.

The apparatus preferably further comprises determination means for determining whether the page data is data accompanied by formation of an image by the image formation means, wherein if the determination means has determined that the page data is accompanied by formation of an image, the polygon-mirror rotation command means starts rotation of the polygon mirror when the page data starts to be created.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

The construction of a laser printer to which embodiments of the present invention are applied will be described with reference to FIG. 1.

Figure 1:
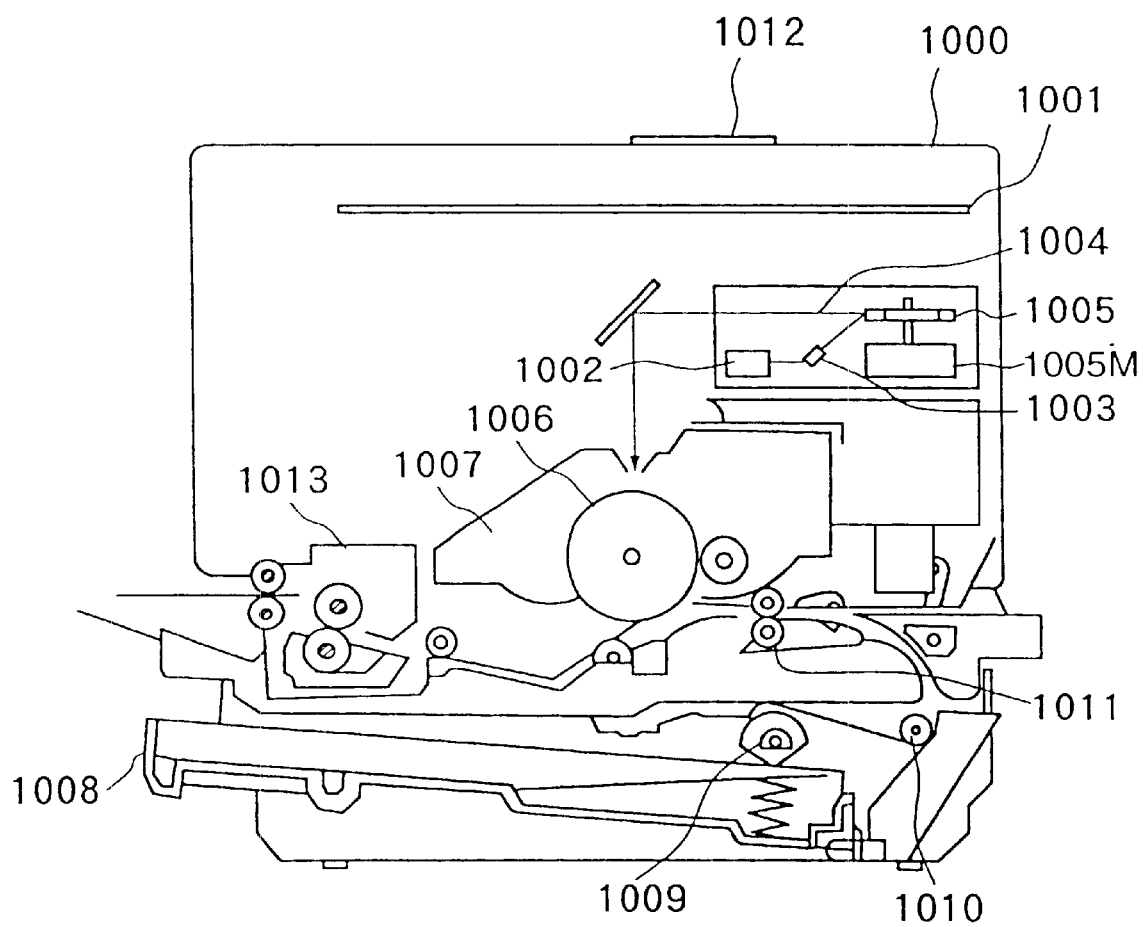
FIG. 1 is a sectional view illustrating the construction of a first output apparatus to which the present invention can be applied.

FIG. 1 is a sectional view showing the construction of a laser printer serving as a first output apparatus to which the present invention is applicable.

In FIG. 1, print information (character codes, etc.), form information or macro instructions, etc., which are supplied from an externally connected host computer are input to and stored in a laser printer 1000. In accordance with this information, the laser printer 1000 creates character patterns or form patterns and forms an image on printing pattern serving as a print medium. The laser printer 1000 has a control panel 1012 on which are arrayed switches and LED indicators, etc., for operating the printer. A control unit 1001 controls the overall laser printer 1000 and analyzes character information and the like supplied from the host computer. The printer control unit 1001 mainly converts character information to a video signal of the corresponding character pattern and outputs the video signal to a laser driver 1002. The latter is a circuit for driving a semiconductor laser 1003 and turns on and off a laser beam 1004, which is emitted from the semiconductor laser 1003, in accordance with the video signal applied thereto. The laser beam 1004 is swept back and forth by a rotatable polygon mirror 1005, which is driven by a scanner motor 1005M, so as to scan and expose an electrostatic drum 1006. As a result, an electrostatic latent image of a character pattern is formed on the electrostatic drum 1006. The latent image is developed by a developing unit 1007 surrounding the electrostatic drum 1006, after which the developed image is transferred to the printing paper. Cut sheets are used as the printing paper and are stored in a paper cassette 1008 that has been loaded in the laser printer 1000. The printing paper is fed into the apparatus by a feed roller 1009 and transport rollers 1010, 1011 so as to be supplied to the electrostatic drum 1006. Here transfer to the printing paper takes place so as to form the image. The printing paper to which the image has been transferred by the electrostatic drum 1006 is fixed by a fixing unit 1013, after which the paper is discharged from the apparatus. The body of the laser printer 1000 is equipped with one or more card slots so that font cards having optional fonts supplementing the internal fonts or control cards (emulation cards) for different language systems can be inserted. Since main scanning by the laser beam is carried out by the rotatable polygon mirror 1005, the rotatable polygon mirror 1005 and scanner motor 1005M shall be referred to collectively as a "scanner".

Figure 2:
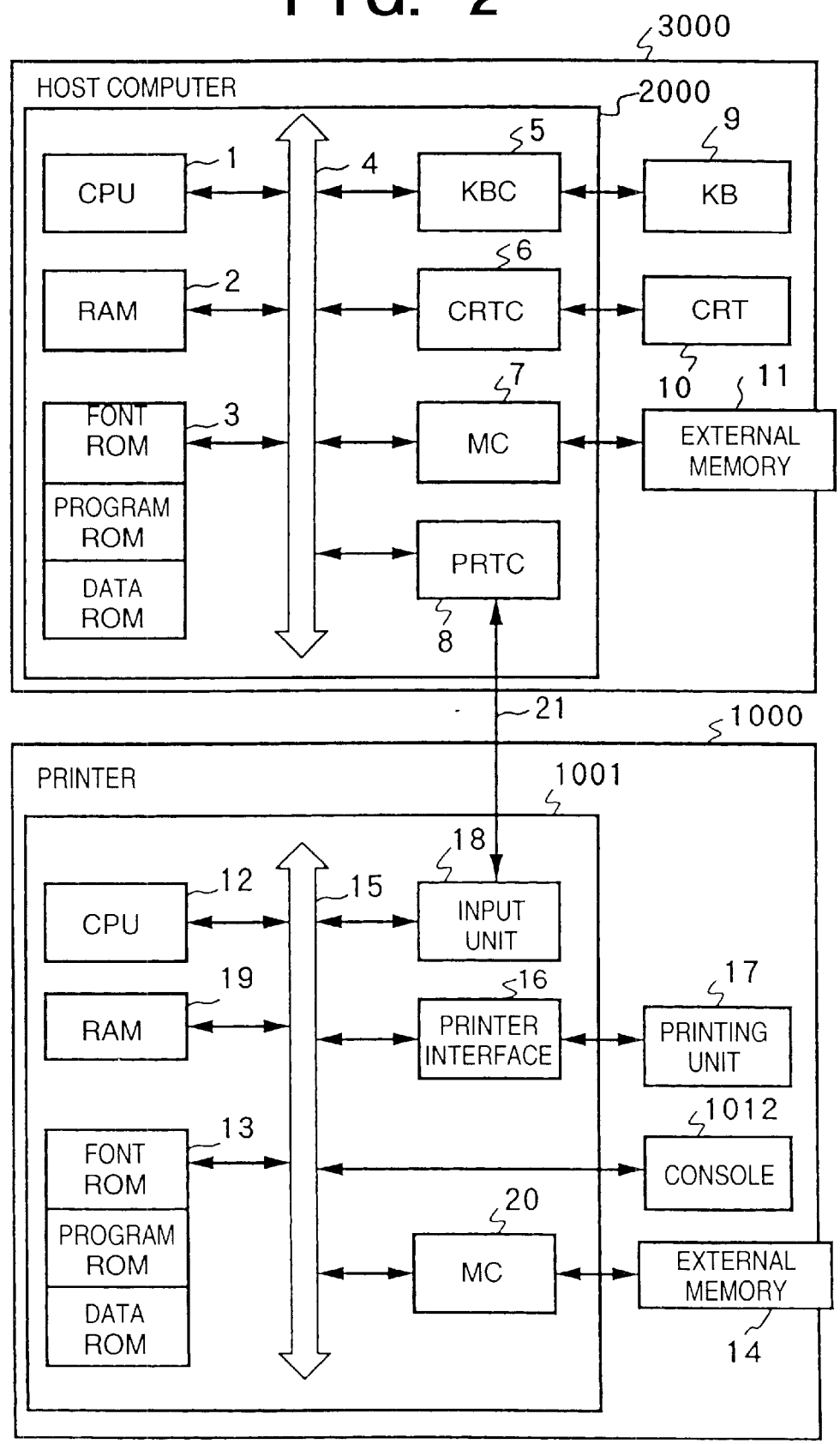
FIG. 2 is a block diagram useful in describing the configuration of a printer control system illustrating an embodiment of the present invention.

FIG. 2 is a block diagram for describing the configuration of a printer control system according to this embodiment. The system will be described taking the laser printer of FIG. 1 as an example. It should be noted that as long as the functions of the present invention are implemented, the present invention can be applied even the functions are implemented by a stand-alone device, a system comprising a plurality of devices or a system in which processing is executed via a network such as a LAN.

The system shown in FIG. 2 includes a host computer 3000 having a CPU 1 which, on the basis of a word processing program that has been stored in a program ROM of a ROM 3, executes the word processing of a document containing mixed objects such as graphics, images, text and tables (inclusive of spreadsheets, etc.). The CPU 1 performs overall control of various devices connected to a system bus 4.

The program ROM of the ROM 3 stores the control program, etc., of the CPU 1, a font ROM of the ROM 3 stores font data, etc., used when the above-mentioned word processing is executed, and a data ROM of the ROM 3 stores various data (e.g., fixed-format patterns, forms for test printing, etc.) used when the above-mentioned word processing is executed. A RAM 2 functions as the main memory and work area of the CPU 1. A keyboard controller (KBC) 5 controls key inputs from a keyboard 9 and pointing device, which is not shown. A CRT controller (CRTC) 6 controls the display on a CRT display (CRT) 10. A main controller (MC) 7 controls access to an external memory 11, such as a hard disk (HD) or floppy disk (FD), which stores a booting program, various applications, font data, user files and edited files. A printer controller (PRTC) 8, which is connected to a printer 1000 via a prescribed bidirectional interface 21, executes processing for controlling communication with the printer 1000. On the basis of commands designated by a mouse cursor (not shown) on the CRT 10, the CPU 1 opens various windows that have been registered and executes a variety of data processing.

The printer 1000 has a printer CPU 12 which, on the basis of a control program stored in a program ROM of a ROM 13 or a control program stored in an external memory 14, controls overall access to various devices connected to a device bus 15 and outputs an image signal, which serves as output information, to a printing unit (printer engine) 17 connected via a printer interface 16. A control program of the CPU 12 is stored in the program ROM of the ROM 13. Font data used when the above-mentioned output information is generated is stored in a font ROM of the ROM 13. In case of a printer not equipped with the external memory 14 such as a hard disk, information utilized in the host computer is stored in a data ROM of the ROM 13. The CPU 12, which can execute processing for communicating with the host computer via an input unit 18, is capable of notifying the host computer 3000 of information internal to the printer 1000. A main memory 19 of the CPU 12 is a RAM which functions as a work area or the like and is so adapted that memory capacity can be expanded by optional RAM connected to an add-on port, not shown. The RAM 19 is used as an area for developing output information, as an area for storing environment data and as an NVRAM (non-volatile RAM). The external memory 14, such a hard disk (HD) or IC card, has its access controlled by a memory controller (MC) 20. The external memory 14, which is connected to the printer as an option, stores font data, an emulation program and form data, etc. Further, a control panel 1012 has an array of operation switches and LED indicators for operating the printer, as mentioned earlier.

The external memory 14 is not limited to a single memory. A plurality of these memories can be provided and an arrangement may be adopted in which a plurality of optional cards storing optional fonts to supplement the internal fonts or a plurality of external memories storing programs for interpreting printer control languages of different language systems can be connected to the apparatus. Furthermore, the external memory 14 may have an NVRAM (not shown) for storing printer mode setting information from the control panel 1012.

[Description of Printer Control Method]

Figure 3:
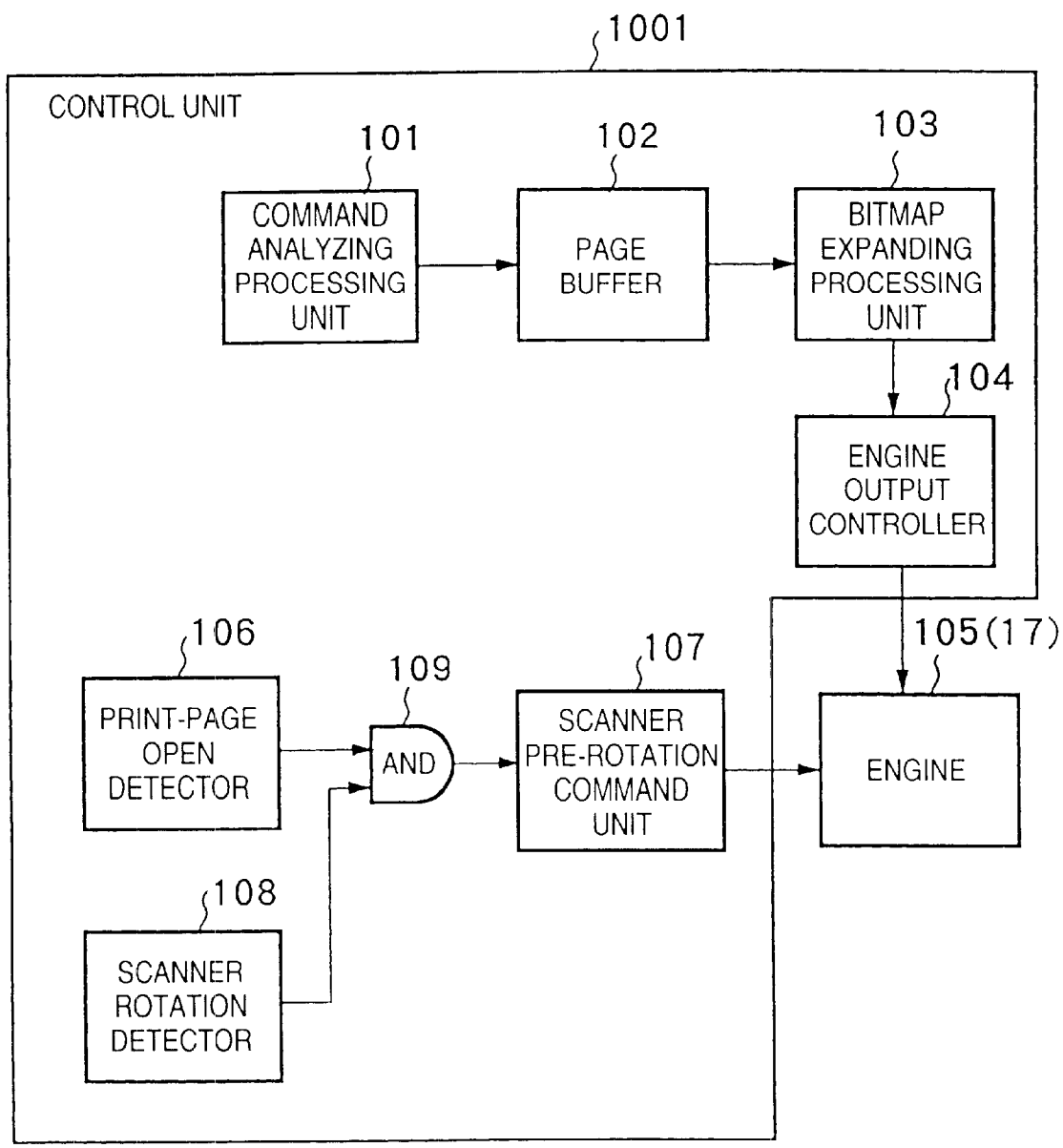
FIG. 3 is a block diagram useful in describing the control components of an image output apparatus according to a first embodiment.

FIG. 3 is a functional block diagram of a laser printer according to this embodiment.

An engine 105 in FIG. 3 corresponds to the printing unit 17 of FIG. 2, while the other blocks are implemented by software or hardware in the printer control unit 1001. In case of software implementation, a program which implements a flowchart of a procedure (described later) is executed by the CPU 12. In accordance with the arrangement shown in FIG. 3, preliminary rotation of a scanner is performed when a page is opened. A control procedure for preliminary scanner rotation carried out by this arrangement will be described with reference to the flowcharts of FIGS. 4 and 5. The procedures of FIGS. 4 and 5 are executed asynchronously.

In this description, a print page is one page of print data. The print page is analyzed, one page of intermediate data is created and is printed by the printer engine immediately to effect the printing of one page. Ordinary print data includes a print page.

Figure 4:
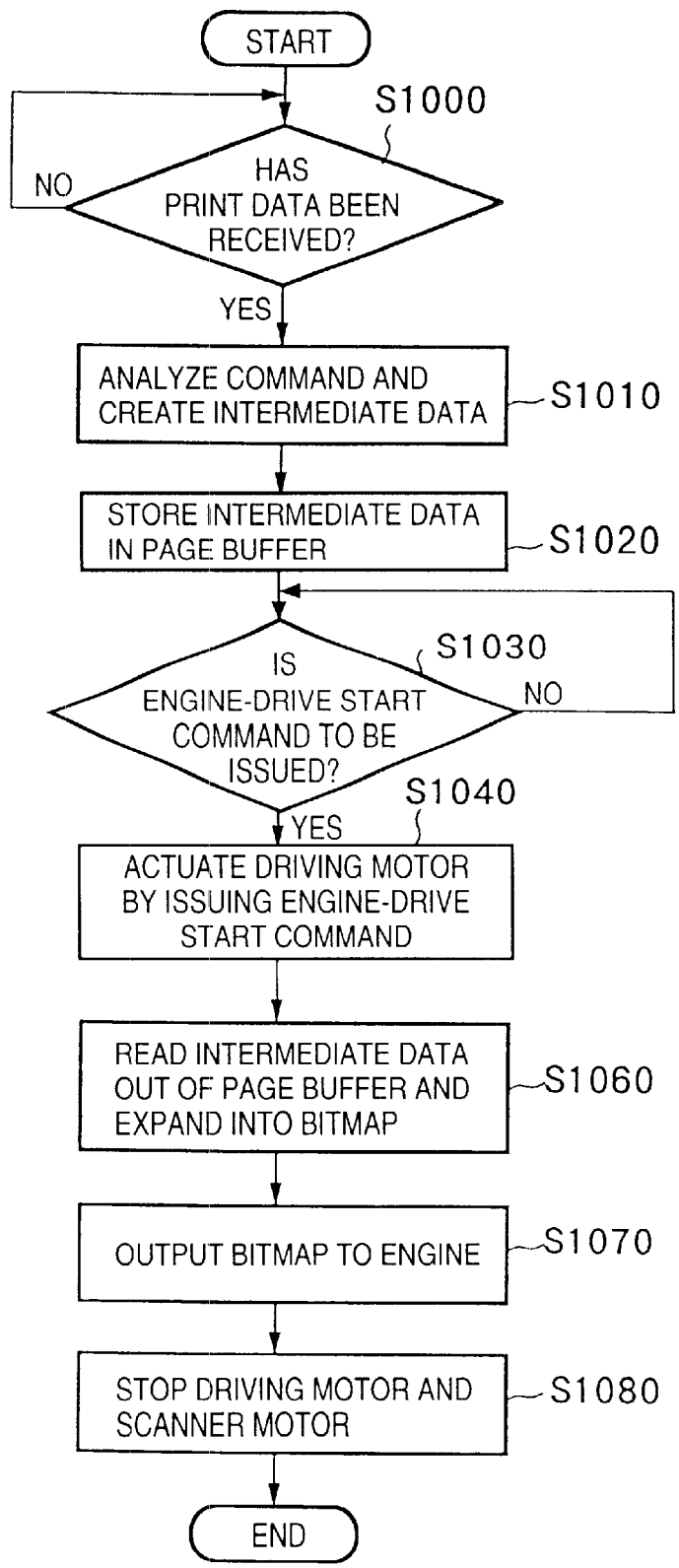
FIG. 4 is a flowchart useful in describing processing executed by the image output apparatus of the first embodiment.
Figure 5:
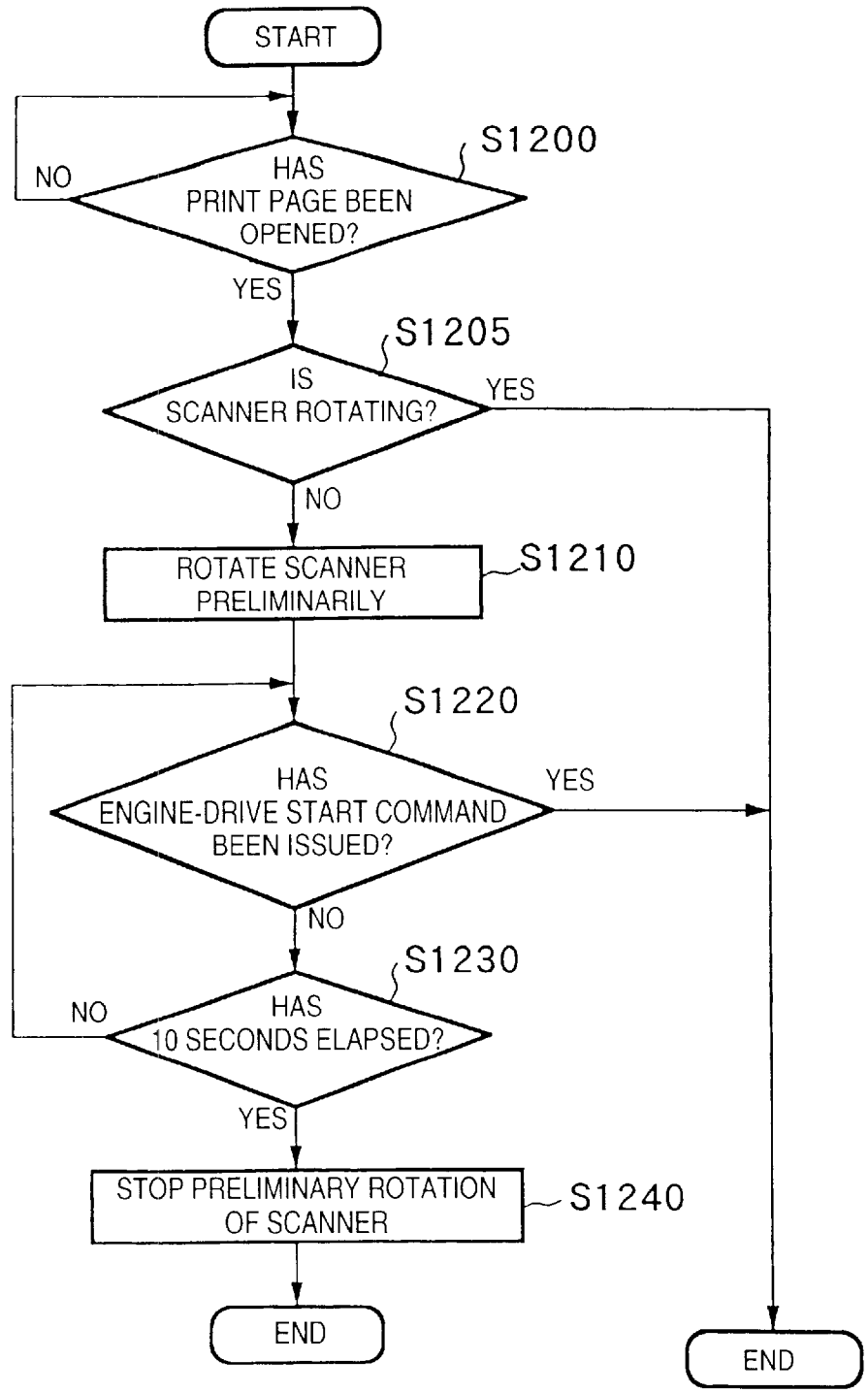
FIG. 5 is a flowchart useful in describing processing executed by the image output apparatus of the first embodiment.

When data enters from a host computer, the data is stored temporarily in a receive buffer (not shown) and then undergoes command analysis and editing in a command analyzing processing unit 101, whereby intermediate data is created (steps S1000 and S1010 in FIG. 4). The intermediate data that has been created is stored in a page buffer 102 (step S1020). When the intermediate data is stored in the page buffer 102, it is determined whether an engine-drive start command is to be issued (step S1030) and, if it is, actuates a driving motor (not shown) that accompanies the engine 105 by issuing the engine-drive start command (step 1040).

The intermediate data that has been stored in the page buffer 102 is sent to a bitmap expanding processing unit 103, which expands the data into a bitmap (step S1060). The bitmap obtained is output to the engine 105 by an engine output controller 104 in accordance with an engine synchronizing signal (not shown). The engine responds by printing and discharging the printed page (step S1070). The step S1060 and the step S1070 are preferably performed in parallel. When page discharge processing by the engine 105 ends, the driving motor and scanner motor are stopped (step S1080).

Meanwhile, as shown in FIG. 5, a print-page open detector 106 detects whether a print page has been opened (step S1200). If a print page has been opened, the scanner rotation detector 108 detects whether the scanner is rotating (step S1205). If the scanner is rotating, processing is terminated without commanding that preliminary rotation of the scanner be performed. If it is found at step S1205 that the scanner is not rotating, a scanner preliminary-rotation command unit 107 issues a scanner preliminary-rotation command, whereby the scanner motor 1005M (FIG. 1) accompanying the engine 105 is rotated in advance of printing (i.e., is rotated preliminarily) (step S1210). Next, it is determined whether an engine-drive start command to start the engine 105 has been issued (step S1220). If the engine-drive start command has been issued, processing is terminated without commanding preliminary rotation of the scanner. If it is found at step S1220 that the engine-drive start command has not been issued, whether a predetermined period of time, e.g., 10 seconds, has elapsed following preliminary rotation of the scanner is detected (step S1230). If 10 seconds has elapsed, preliminary scanner rotation is halted (step S1240) and processing is exited. In a case where it is found at steps S1220 and S1230 that the engine-drive start command was issued before elapse of 10 seconds following preliminary rotation of the scanner, processing is terminated without stopping preliminary rotation of the scanner.

This embodiment illustrates a case in which print data is received from a host computer. However, this does not impose a limitation upon the present invention; similar processing is executed also when test printing internally of a printer or printing off-line of a font list or the like is carried out.

The opening of a page refers to initialization processing for creating one page of intermediate data from one print page. Therefore, if data received from the host computer is not print data but a command for requiring a status of the printer, or the like down loaded data, opening of a page is not performed. Intermediate-data layout information or the like is stored in association with a print page that has been opened. When one page of intermediate data is created, this page is closed.

[Description of Jobs and Pages]

Figure 6:
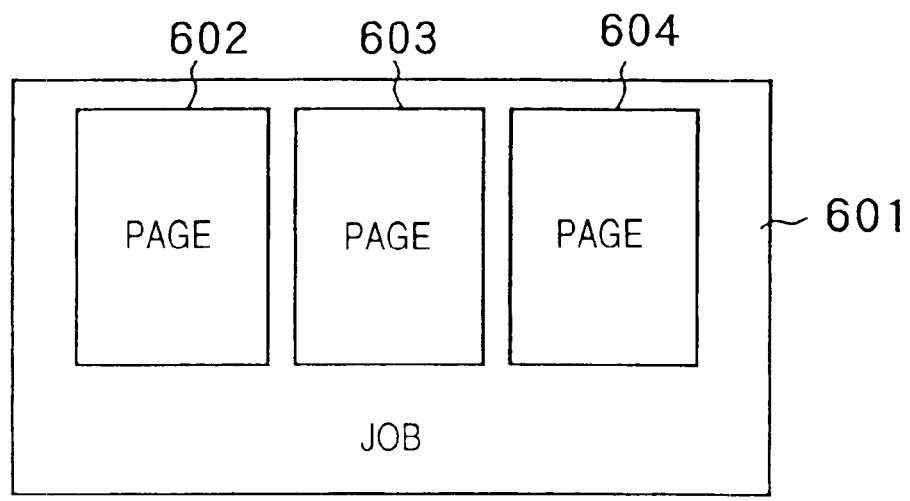
FIG. 6 is a diagram useful in describing a job and pages in the image output apparatus of the first embodiment.
Figure 7:
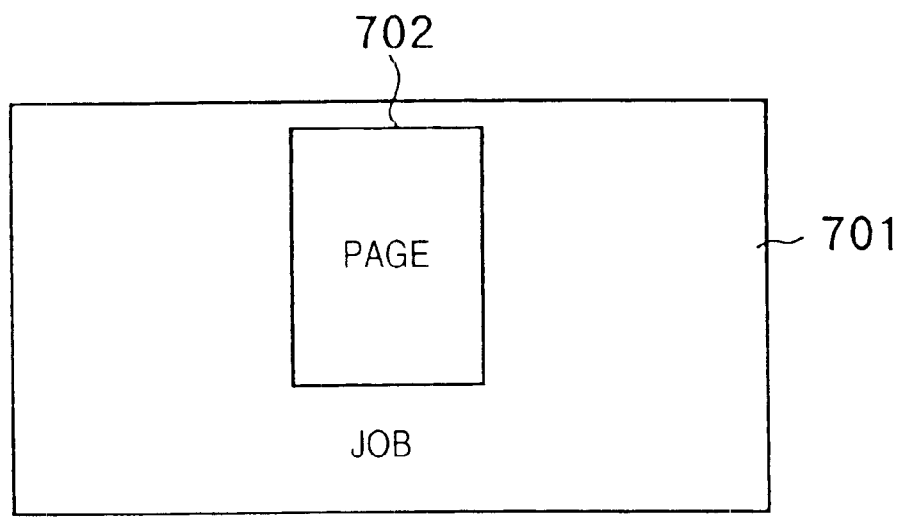
FIG. 7 is a diagram useful in describing a job and a page in the image output apparatus of the first embodiment.

FIGS. 6 and 7 are diagrams displaying jobs and pages. FIG. 6 is an example showing an arrangement in which a plurality of pages are included in one job. Here a job 601 is composed of three pages, namely pages 602, 603 and 604. FIG. 7 is an example showing an arrangement in which only one page is included in one job. Here a job 701 is composed of only one page, namely a page 702.

[Description of Timing at Which Scanner Preliminary-rotation Command is Issued]

Figure 8:
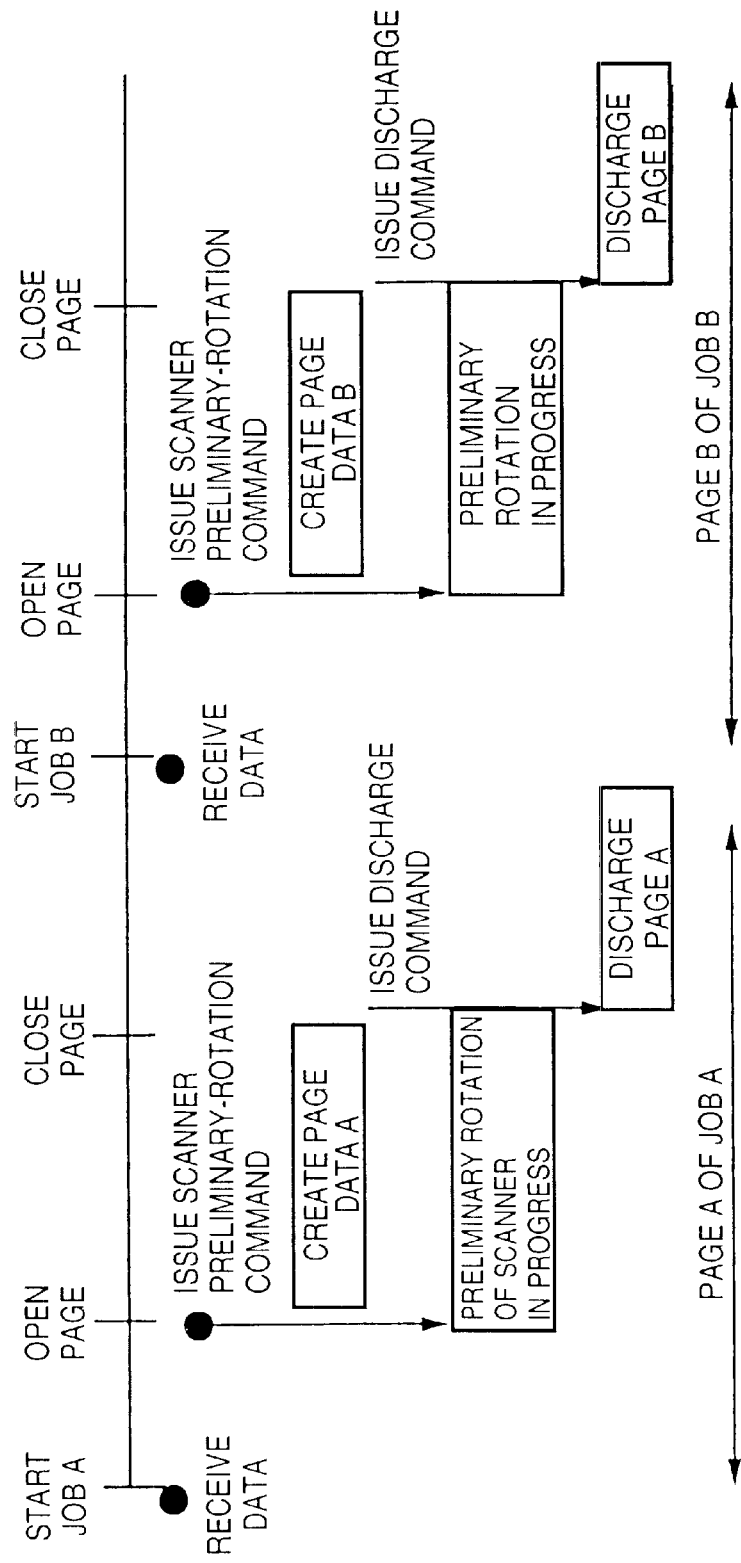
FIG. 8 is a diagram useful in describing timing at which a scanner preliminary-rotation command is issued in the image output apparatus of the first embodiment.

FIG. 8 is a chart illustrating timing for issuing the scanner preliminary-rotation command in a case where one page is printed in one job.

When a job A is received, the job is started. If a print page is opened following start of the job, first the command to rotate the scanner preliminarily is issued. If following the opening of the print page one page of intermediate data (referred to as "page data" below) is created and the page is closed, a command to discharge the page data (i.e., the above described engine drive start command) is issued and the page data is discharged.

Operation regarding a job B is similar to that of the job A and need not be described.

Since the scanner is thus first rotated preliminarily following the opening of a page, the rotatable polygon mirror attains the required rotational speed at the moment the page data is discharged. Following the creation of the page data, therefore, it is no longer necessary to wait for the rotational speed of the polygon mirror to attain a satisfactory value. This makes it possible to shorten the first-page discharge time.

Second Embodiment

Figure 9:
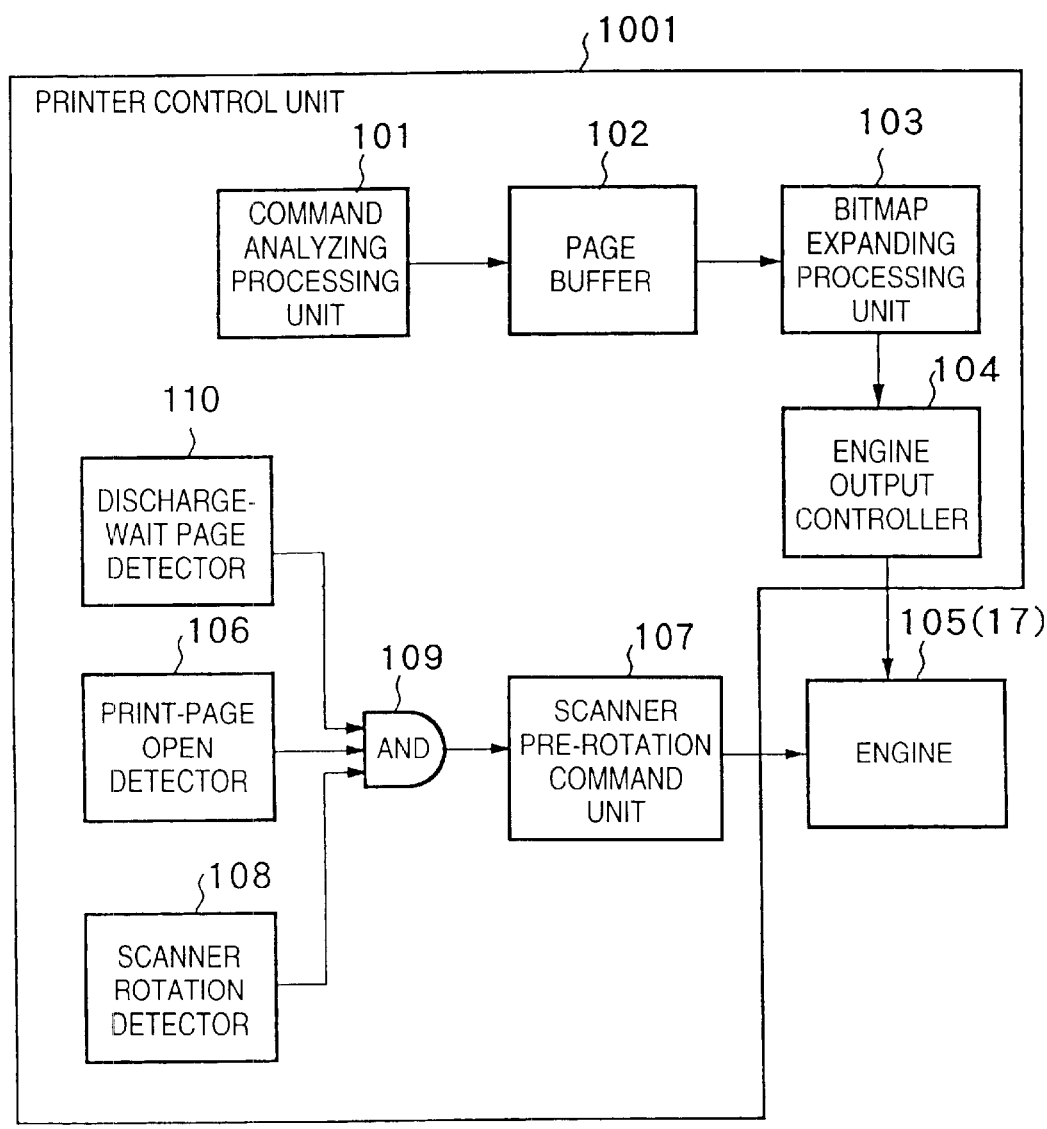
FIG. 9 is a block diagram useful in describing the control components of an image output apparatus according to a second embodiment.

FIG. 9 is a block diagram showing a laser printer according to a second embodiment. This embodiment is such that when page data that has already been created exists (i.e., when discharge of paper is being awaited), the command for preliminary rotation of the scanner is not issued even when a page is opened. It should be noted that blocks in FIG. 9 having functions identical with those of the first embodiment are designated by like reference characters. The procedure in this case will be described in accordance with the flowcharts of FIGS. 10 and 11.

Figure 10:
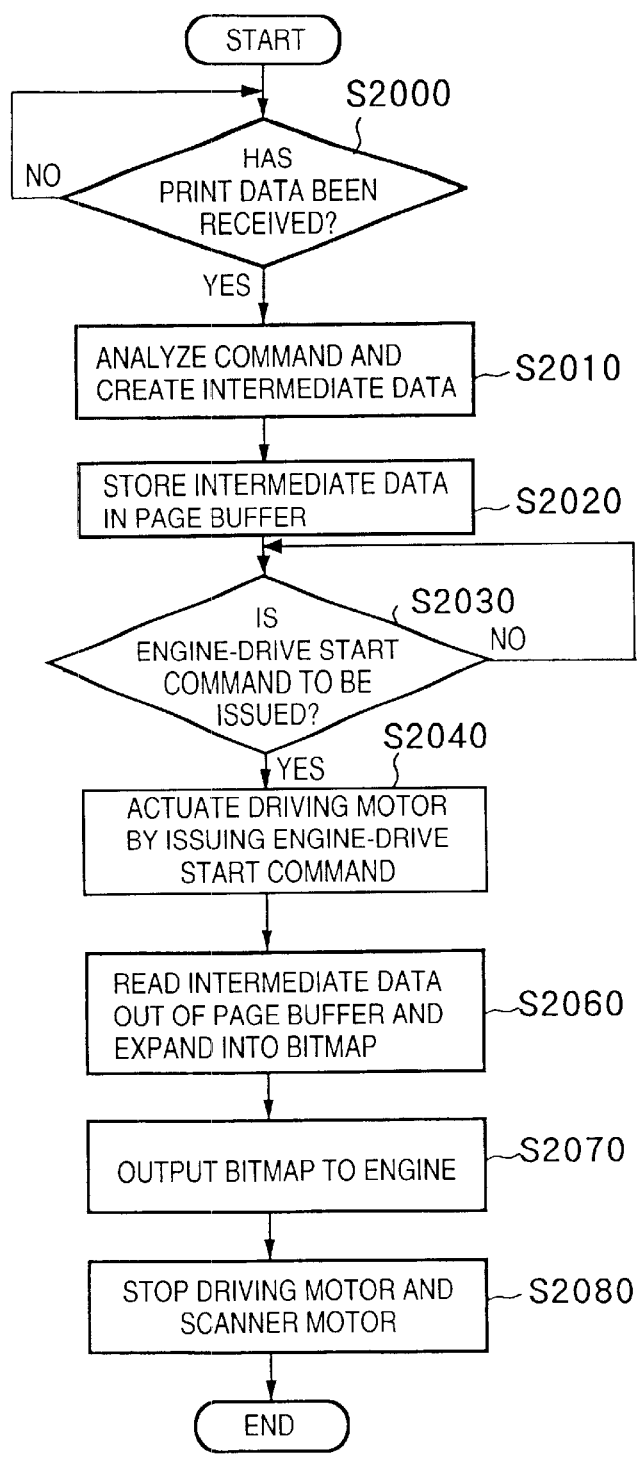
FIG. 10 is a flowchart useful in describing processing executed by the image output apparatus of the second embodiment.

When data enters from a host computer, the data is stored temporarily in a receive buffer (not shown) and then undergoes command analysis and editing in the command analyzing processing unit 101, whereby intermediate data is created (steps S2000 and S2010 in FIG. 10). The intermediate data that has been created is stored in the page buffer 102 (step S2020). When the intermediate data is stored in the page buffer 102, it is determined whether an engine drive start command is to be issued (step S2030) and, if it is, actuates a driving motor (not shown) that accompanies the engine 105 by issuing the engine-drive start command (step 2040).

The intermediate data that has been stored in the page buffer 102 is sent to the bitmap expanding processing unit 103, which expands the data into a bitmap (step S2060). The bitmap obtained is output by the engine output controller 104 to the engine 105 in accordance with an engine synchronizing signal (not shown). The engine responds by printing and discharging the printed page (step S2070). The step S2060 and the step S2070 are preferably performed in parallel. When page discharge processing by the engine 105 ends, the driving motor and scanner motor are stopped (step S2080).

Figure 11:
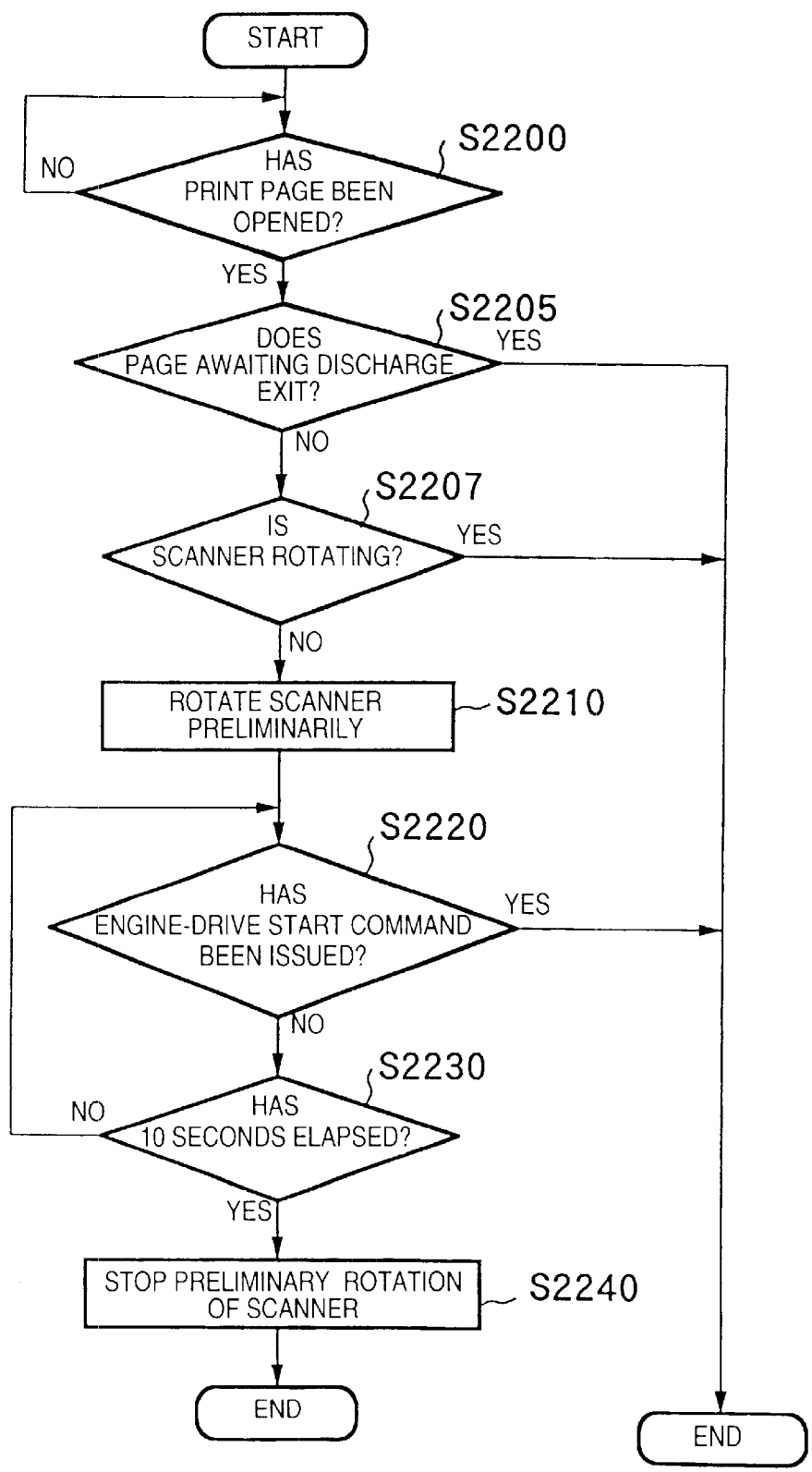
FIG. 11 is a flowchart useful in describing processing executed by the image output apparatus of the second embodiment.

Meanwhile, as shown in FIG. 11, the print-page open detector 106 detects whether a print page has been opened (step S2200). If a print page has been opened, a discharge-wait page detector 110 detects whether a page awaiting discharge exists (step S2205). If a page awaiting discharge exists, processing is terminated without commanding that scanner preliminary rotation be performed. If it is found at step S2205 that a page awaiting discharge does not exist, the scanner rotation detector 108 detects whether the scanner is rotating (step S2207). If the scanner is rotating, processing is terminated without commanding that scanner preliminary rotation be performed.

If it is found at step S2207 that the scanner is not rotating, the scanner preliminary-rotation command unit 107 issues a scanner preliminary-rotation command, whereby the scanner motor 1005M (FIG. 1) accompanying the engine 105 is rotated preliminarily (step S2210). Next, it is determined whether an engine-drive start command to start the engine 105 has been issued (step S2220). If the engine-drive start command has been issued, processing is terminated without commanding preliminary rotation of the scanner. If it is found at step S2220 that the engine-drive start command has not been issued, whether a predetermined period of time, e.g., 10 seconds, has elapsed following preliminary rotation of the scanner is detected (step S2230). If 10 seconds has elapsed, scanner preliminary rotation is halted (step S2240) and processing is exited. In a case where it is found at steps S2220 and S2230 that the engine-drive start command was issued before elapse of 10 seconds following preliminary rotation of the scanner, processing is terminated without stopping preliminary rotation of the scanner.

[Description of Timing at Which Scanner Preliminary-rotation Command is Issued]

Figure 12:
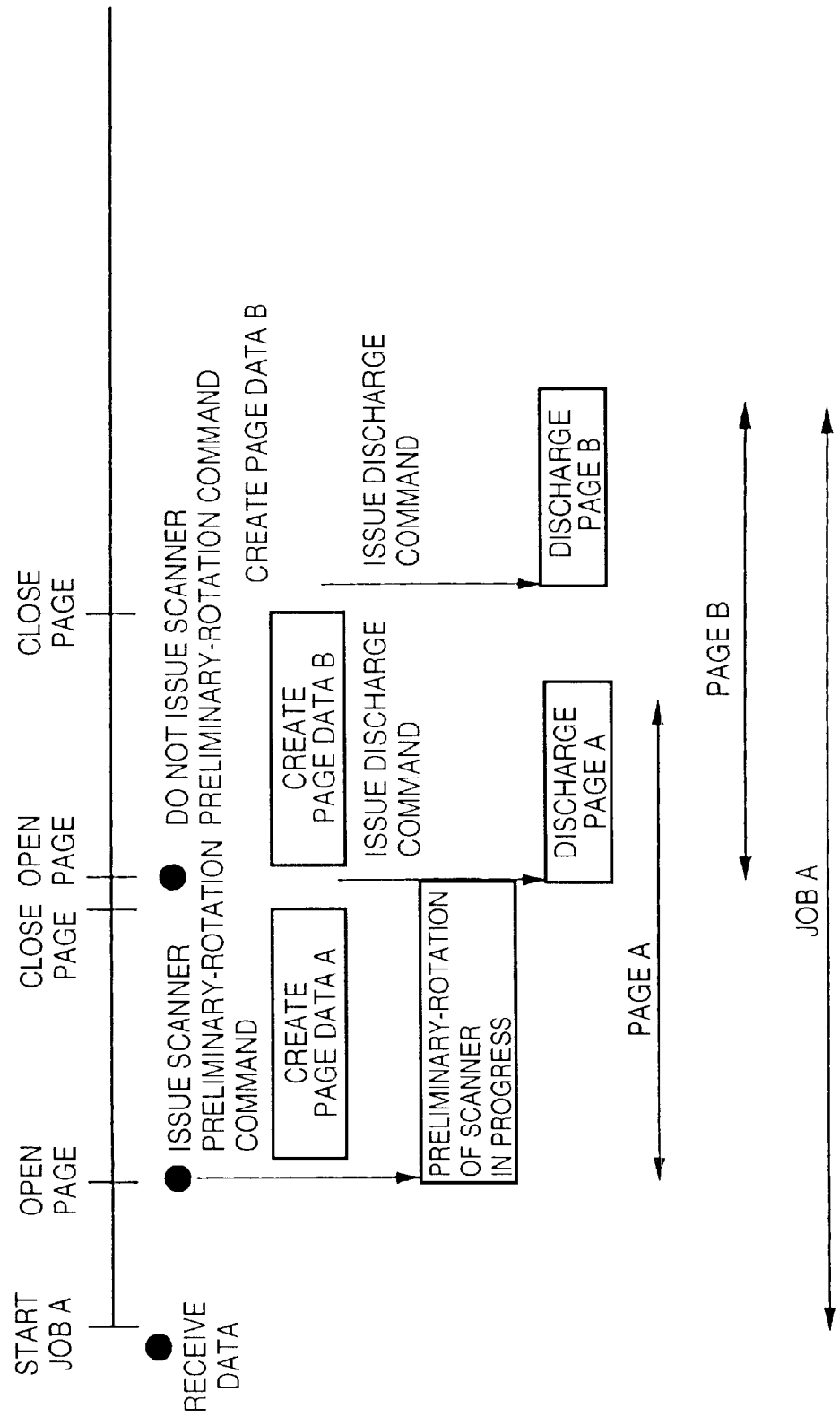
FIG. 12 is a diagram useful in describing timing at which a scanner preliminary-rotation command is issued in the image output apparatus of the second embodiment.

FIG. 12 is a chart illustrating timing for issuing the scanner preliminary-rotation command in a case where a job A is executed. In job A, one job includes two print pages.

When job A is received, the job is started. If a first print page A is opened following start of the job, first the command to rotate the scanner preliminarily is issued. If following the opening of the page one page of intermediate data (referred to as "page data" below) is created (the page is closed), a command to discharge the page data A is issued and the page data A is discharged.

When second print page B has been opened, the page data A is waiting for discharge and, hence, the command to rotate the scanner preliminarily is not issued. This is because the scanner is already rotating owing to discharge of the page data A.

This embodiment illustrates a case in which two pages (plural pages) are printed in one job. However, this does not impose a limitation upon the present invention; similar processing is executed also in a case where a plurality of jobs are printed successively with one job containing one page.

Since the scanner is thus first rotated preliminarily following the opening of a page, the rotatable polygon mirror attains the required rotational speed at the moment the page data is discharged. Following the creation of the page data, therefore, it is no longer necessary to wait for the rotational speed of the polygon mirror to attain a satisfactory value. This makes it possible to shorten the first-page discharge time. Further, in a case where page data awaiting discharge exists, it is arranged so that the scanner preliminary-rotation command is not issued even when a page is opened. As a result, the command for preliminary rotation of the scanner is not issued needlessly.

Third Embodiment

Figure 13:
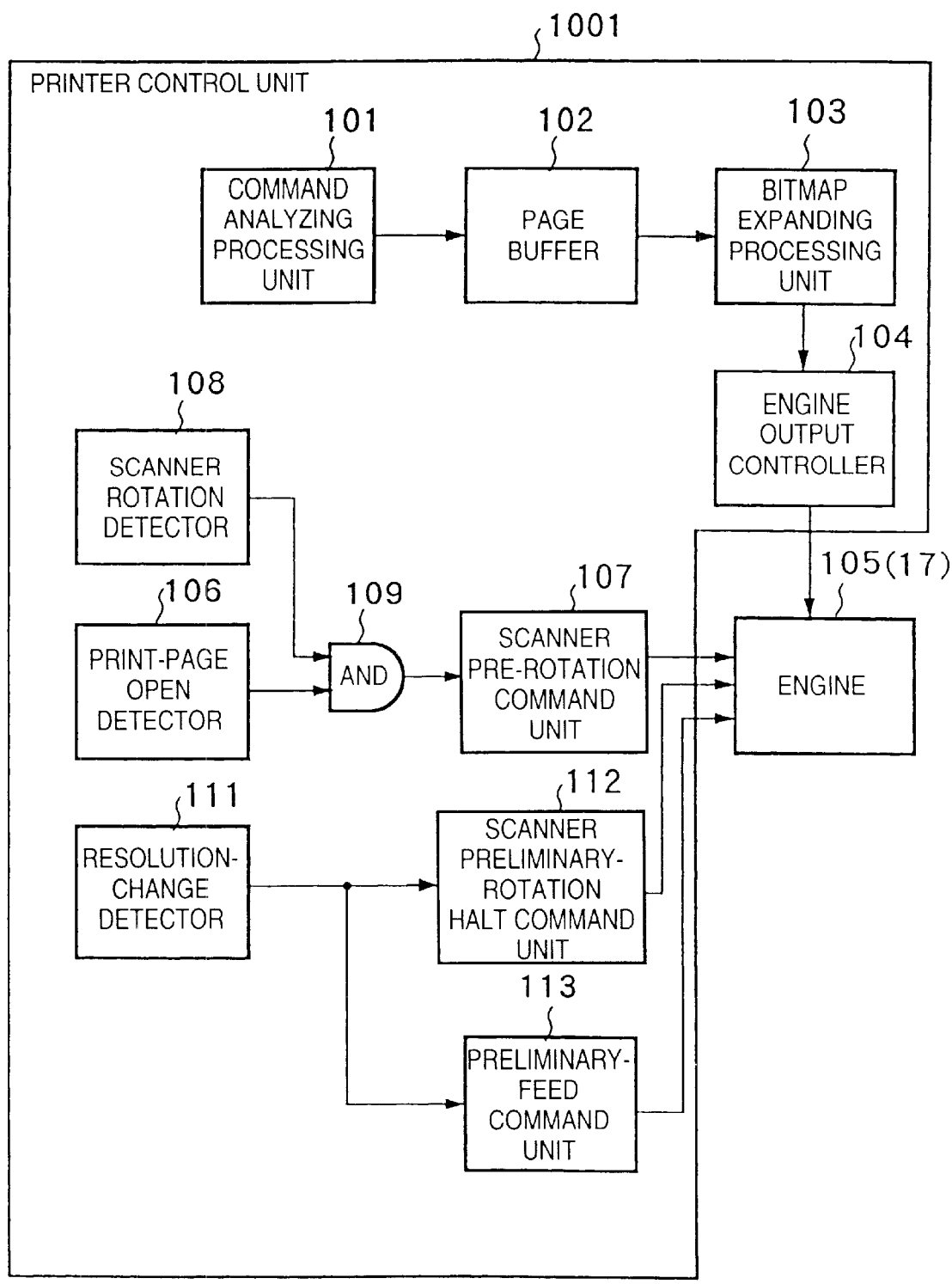
FIG. 13 is a block diagram useful in describing the control components of an image output apparatus according to a third embodiment.

FIG. 13 is a block diagram showing a laser printer according to a third embodiment. The printer according to this embodiment has a preliminary feed function for feeding paper up to a point just short of a printing position. Further, if there is a change is resolution, preliminary rotation of the scanner is halted and preliminary feed is not carried out. It should be noted that blocks in FIG. 13 having functions identical with those of the first embodiment are designated by like reference characters. The procedure in this case will be described in accordance with the flowcharts of FIGS. 14 and 15.

When data enters from a host computer, the data is stored temporarily in a receive buffer (not shown) and then starts command analysis and editing in the command analyzing processing unit 101, whereby a page is opened for the created intermediate data (steps S3000–S3020 in FIG. 10). When the page is opened, a resolution-change detector 111 detects whether resolution has been changed (step S3035). If resolution has been changed and the scanner is rotating by, for example, the instruction of the preliminary rotation of the scanner, a scanner rotation halt command unit 112 halts the rotation of the scanner (step S3026). Alternatively, the resolution-change detector 111 may detect whether resolution has been changed before the preliminary rotation command of the scanner is issued. In this case, if resolution has been changed, the preliminary rotation command of the scanner is not issued.

If it is found at step S3025 that the resolution has not been changed, then preliminary feed is performed by a preliminary-feed command unit 113 (step S3027). In step S3030, it is determined that the engine-drive start command should be issued at a predetermined timing if storing of the intermediate data to the page buffer is finished.

If it is found at step S3030 that an engine-drive start command is to be issued, the driving motor accompanying the engine 105 and the scanner motor are actuated by issuing the engine-drive start command (step S3050).

The intermediate data that has been stored in the page buffer 102 is sent to the bitmap expanding processing unit 103, which expands the data into a bitmap (step S3060). The bitmap obtained is output by the engine output controller 104 to the engine 105 in accordance with an engine synchronizing signal (not shown). The engine responds by printing and discharging the printed page (step S3070). When page discharge processing by the engine 105 ends, the driving motor and scanner motor are stopped (step S3080).

Figure 15:
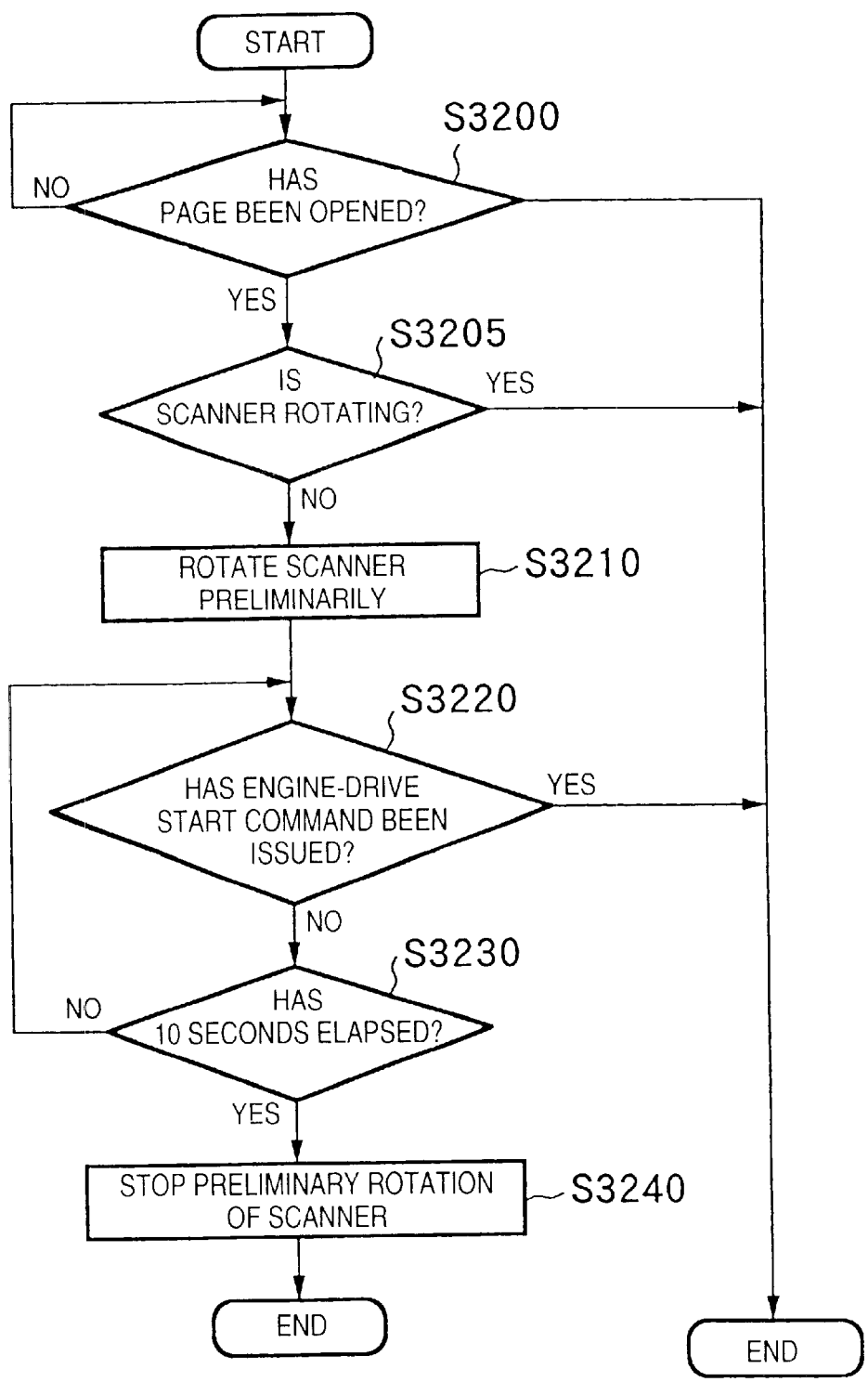
FIG. 15 is a flowchart useful in describing processing executed by the image output apparatus of the third embodiment.

Meanwhile, as shown in FIG. 15, the print-page open detector 106 detects whether a print page has been opened (step S3200). If a print page has been opened, the scanner rotation detector 108 detects whether the scanner is rotating (step S3205). If the scanner is rotating, processing is terminated without commanding that scanner preliminary rotation be performed. If it is found at step S3205 that the scanner is not rotating, the scanner preliminary-rotation command unit 107 issues a scanner preliminary-rotation command, whereby a scanner motor (not shown) accompanying the engine 105 is rotated preliminarily (step S3210). Next, if it is determined at step S3220 that an engine-drive start command has not been issued, whether 10 seconds has elapsed following preliminary rotation of the scanner is detected (step S3230). If 10 seconds has elapsed, scanner preliminary rotation is halted (step S3240) and processing is exited. In a case where it is found at steps S3220 and S3230 that the engine-drive start command was issued before elapse of 10 seconds following preliminary rotation of the scanner, processing is terminated without stopping preliminary rotation of the scanner.

Since the scanner is thus first rotated preliminarily following the opening of a page, the rotatable polygon mirror attains the required rotational speed at the moment the opened page is discharged.

Following the creation of the page data, therefore, it is no longer necessary to wait for the rotational speed of the polygon mirror to attain a satisfactory value. This makes it possible to shorten the first-page discharge time. Further, in a case where resolution has been changed, preliminary rotation of the scanner is stopped and preliminary feed is not carried out. As a consequence, rotation of the polygon mirror and feed of paper start anew after resolution is changed and, hence, printing can be performed at a scanner rotational speed that is commensurate with the changed resolution. This makes it unnecessary to provide a limitation upon a change in resolution.

Fourth Embodiment

Print processing in a printing system in which non-print pages are processed in addition to print pages will be described as a fourth embodiment.

[Description of Print Pages and Non-print Pages]

As set forth earlier, in this description a print page is one page of print data. The print page is analyzed, one page of intermediate data is created and is printed by the printer engine immediately to effect the printing of one page. Ordinary print data includes a print page.

By contrast, a non-print page is one page of print data, wherein the non-print page is analyzed and one page of intermediate data is created. The printer engine does not perform printing using the intermediate data. Alternatively, a non-print page is a page that is not immediately printed by the printer engine even if one page of intermediate data is created based upon the non-print page. For example, registration of an overlay page or a saved job is a non-print page.

An overlay page is a page for overlay placed upon a print page. An overlay page does not undergo print processing independently and is merely registered as overlay page data. When a print page is printed, printing is performed upon superimposing the overlay page on the print page.

A saved job is a job in which even if print data is analyzed and one page of intermediate data created, the intermediate data is not printed by the printer engine but is saved in a storage device such as a hard disk. When a host computer designates printing at an arbitrary timing, the saved job is read out of the storage device such as the hard disk and is printed by the printer engine.

Figure 16:
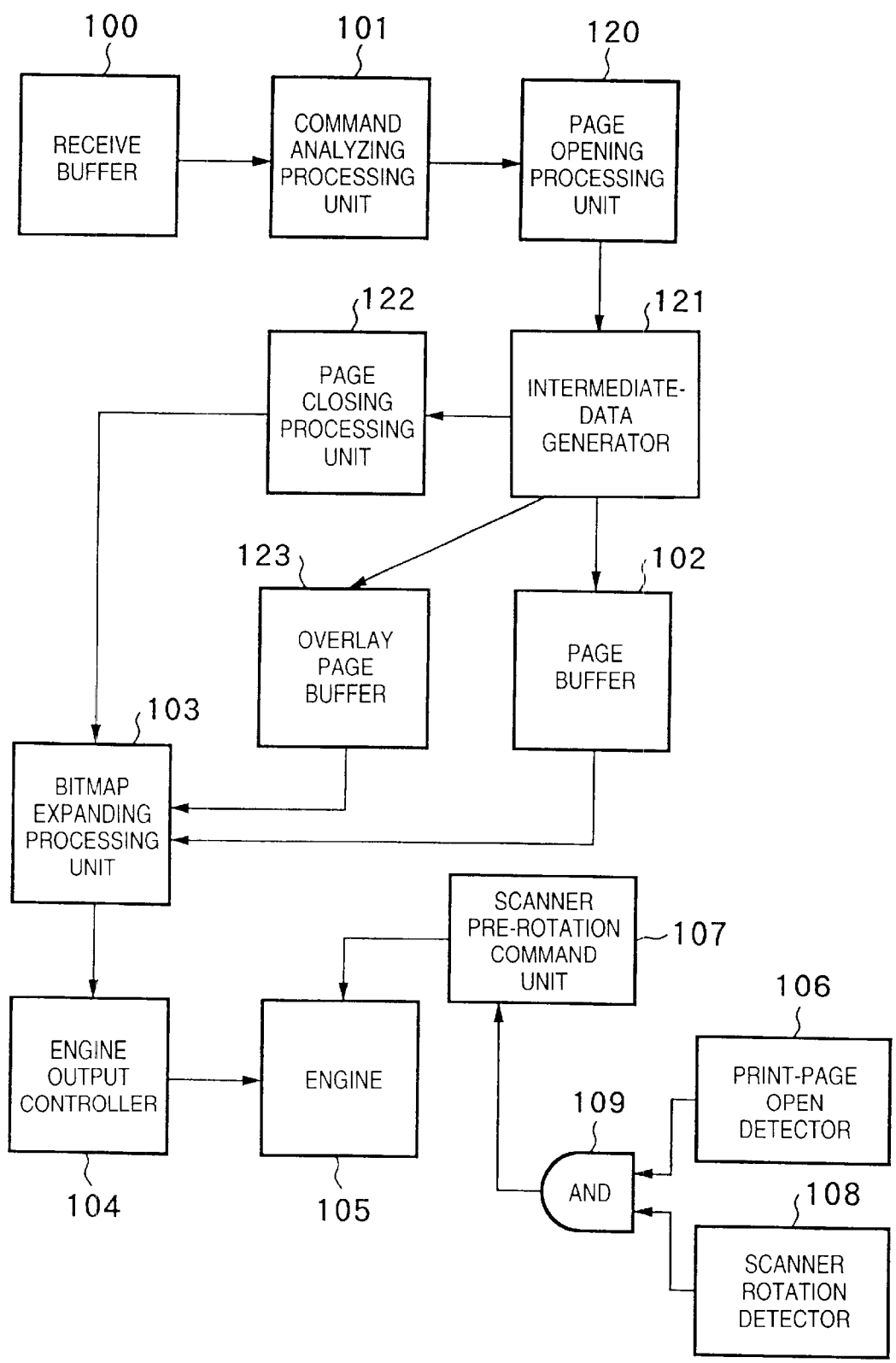
FIG. 16 is a block diagram useful in describing the control components of an image output apparatus according to a fourth embodiment.

FIG. 16 is a block diagram illustrating a procedure for processing print pages and overlay pages. This procedure will be described in conjunction with the flowchart of FIG. 17.

Figure 17:
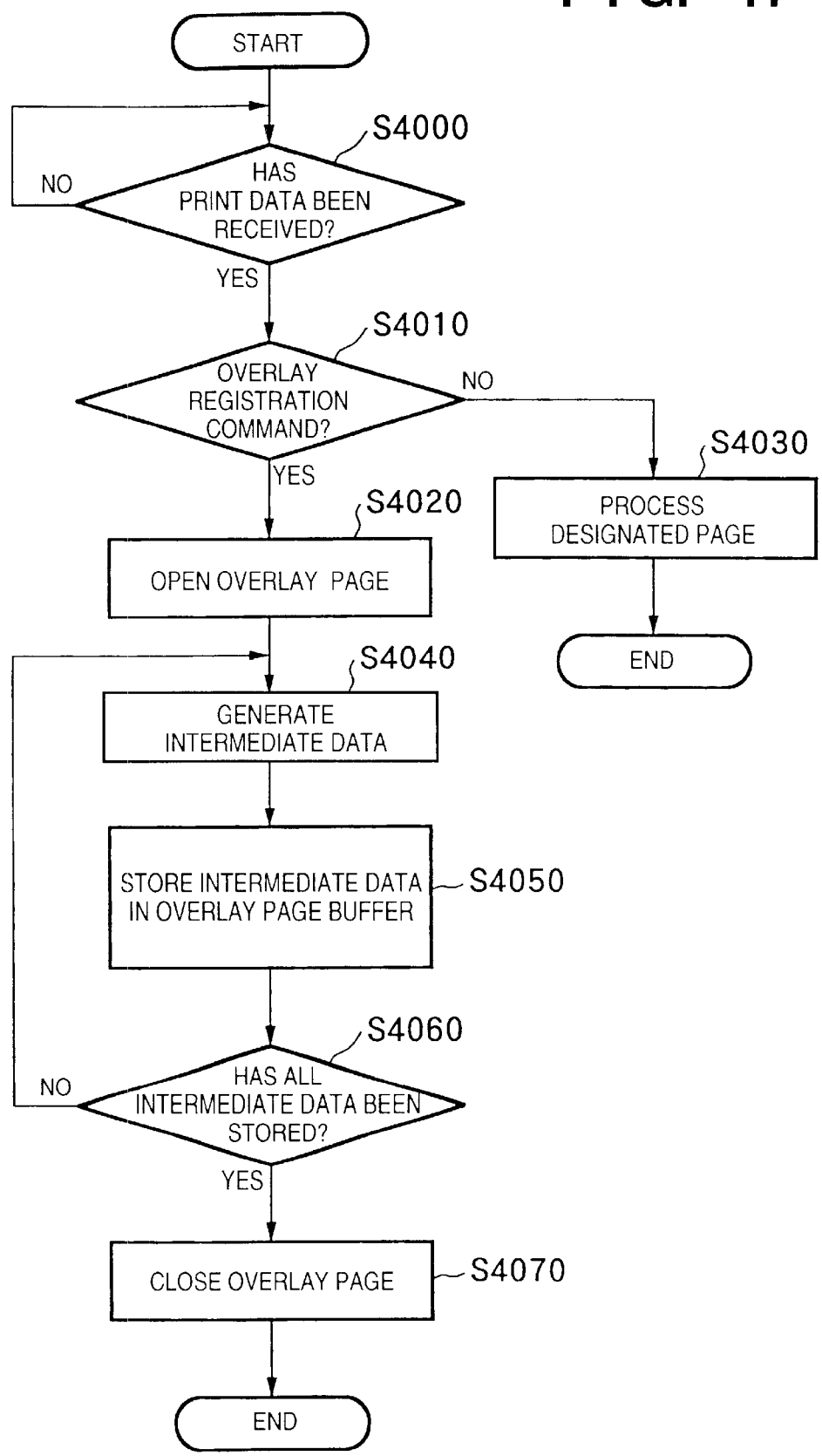
FIG. 17 is a flowchart useful in describing processing executed by the image output apparatus of the fourth embodiment.

When data enters from a host computer, the data is stored temporarily in a receive buffer 100 and then undergoes command analysis in the command analyzing processing unit 101 to determine whether an overlay registration command has been issued (steps S4000 and S4010 in FIG. 17). If an overlay registration command has been issued, an overlay page is opened by a page opening processing unit 120 (step S4020). After the overlay page has been opened, intermediate data is generated in an intermediate-data generator 121 in accordance with the entered command (step S4040) and the intermediate data is stored in an overlay page buffer 123 for the opened overlay page (step S4050). When all intermediate data has been stored ("YES" at step S4060), the overlay page is closed by a page closing processing unit 122, thereby completing registration of the overlay page (step S4070).

If it is found at step S4010 that an overlay registration command has not been issued, processing of the designated page is executed (step S4030). One process executed at step S4030 is that shown in FIG. 18.

Next, processing for combining a registered overlay page with print data and printing the result will be described in conjunction with the flowchart of FIG. 18.

When data enters from a host computer (not shown), the data is stored temporarily in a receive buffer (not shown) and then undergoes command analysis in the command analyzing processing unit 101 to determine whether the input is a print page (steps S5000 and S5010 in FIG. 10). If the input data is a print page, then the print page is opened by the page opening processing unit 120 (step S5020). After the print page has been opened, intermediate data is generated by the intermediate-data generator 121 in accordance with the entered command (step S5040) and the intermediate data is stored in the page buffer 102 for the opened print page (step S5050). When all intermediate data has been stored ("YES" at step S5060), the print page is closed by the page closing processing unit 122 (step S5070). The driving motor is actuated at this time in a manner similar to that of the first embodiment.

When the page is closed, intermediate data is read out of the page buffer 102 for the print page and the page buffer 123 for the overlay page, the intermediate data is sent to the bitmap expanding processing unit 103 while being combined and is expanded into a bitmap (step S5080). The bitmap obtained is output to the engine 105 by the engine output controller 104 in accordance with an engine synchronizing signal (not shown). The engine performs printing and page discharge processing (step S5090). When page discharge processing by the engine 105 ends, the driving motor and scanner motor are stopped (step S5100).

If it is found at step S5010 that the input is not a print page, processing of the designated page is executed (step S5030).

[Detection of Opening of Print Page]

In this embodiment also the print-page open detector 106 of FIG. 16 performs monitoring to determine whether the command analyzing processing unit 101 has received a command indicative of a print page. Control relating to preliminary rotation of the scanner is carried out through the procedure of FIG. 5 by means of the print-page open detector 106.

The print-page open detector 106 detects whether a print page has been opened (step S1200). If a print page has been opened, the scanner rotation detector 108 detects whether the scanner is rotating (step S1205). If the scanner is rotating, processing is terminated without commanding that scanner preliminary rotation be performed. If it is found at step S1205 that the scanner is not rotating, a scanner preliminary-rotation command unit 107 issues a scanner preliminary-rotation command, whereby the scanner motor (not shown) accompanying the engine 105 is rotated preliminarily (step S1210). Next, it is determined whether an engine-drive start command to start the engine 105 has been issued (step S1220). If the engine-drive start command has been issued, processing is terminated without commanding preliminary rotation of the scanner. If it is found at step S1220 that the engine-drive start command has not been issued, then whether a predetermined period of time, e.g., 10 seconds, has elapsed following preliminary rotation of the scanner is detected (step S1230). If 10 seconds has elapsed, scanner preliminary rotation is halted (step S1240) and processing is exited. In a case where it is found at steps S1220 and S1230 that the engine-drive start command was issued before elapse of 10 seconds following preliminary rotation of the scanner, processing is terminated without stopping preliminary rotation of the scanner.

By adopting this arrangement, the scanner is first rotated preliminarily following the opening of a print page. As a result, the rotatable polygon mirror attains the required rotational speed at the moment the page data is discharged. Following the creation of the page data, therefore, it is no longer necessary to wait for the rotational speed of the polygon mirror to attain a satisfactory value. This makes it possible to shorten the first-page discharge time.

Furthermore, in response to opening of a non-print page such as an overlay page, preliminary rotation of the scanner does not start. This makes it possible to prevent needless wear of mechanical components and expendables.

Other Embodiments

A scanner preliminary-rotation control procedure in an apparatus that combines control of non-print pages with the art of the first embodiment has been described as a fourth embodiment. However, it is also possible to combine scanner preliminary-rotation control of the second embodiment or third embodiment with control of non-print pages.

In a case where control of non-print pages is applied to the second embodiment, the output of the discharge-wait page detector 110 in FIG. 9 is applied as an additional input to an AND gate 109 in FIG. 16. The scanner pre-rotation command unit 107 executes control in accordance with the procedure of FIG. 11.

By adopting such an arrangement, even in a case where control of a non-print page is carried out, the command for preliminary rotation of the scanner is not issued, even when the page is opened, if page data awaiting discharge is present. As a result, the command for preliminary rotation of the scanner is not issued needlessly.

Further, in a case where control of non-print pages is applied to the third embodiment, the outputs of the scanner preliminary-rotation halt command unit 112 and preliminary-feed command unit 113, which operate upon receiving the output of the resolution-change detector 111 in FIG. 13, are applied as inputs to the scanner pre-rotation command unit 107 in FIG. 16.

Figure 14:
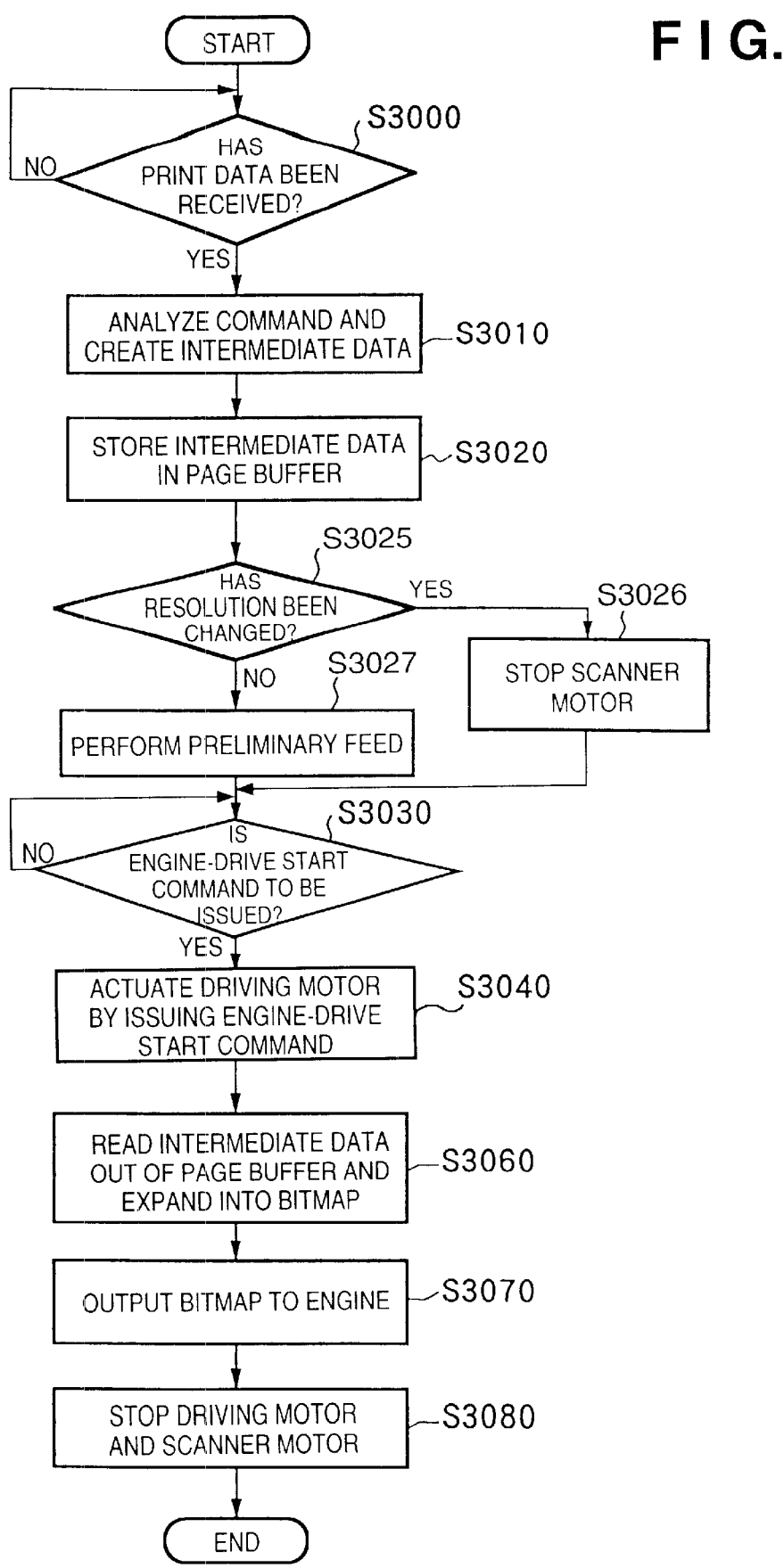
FIG. 14 is a flowchart useful in describing processing executed by the image output apparatus of the third embodiment.
Figure 18:
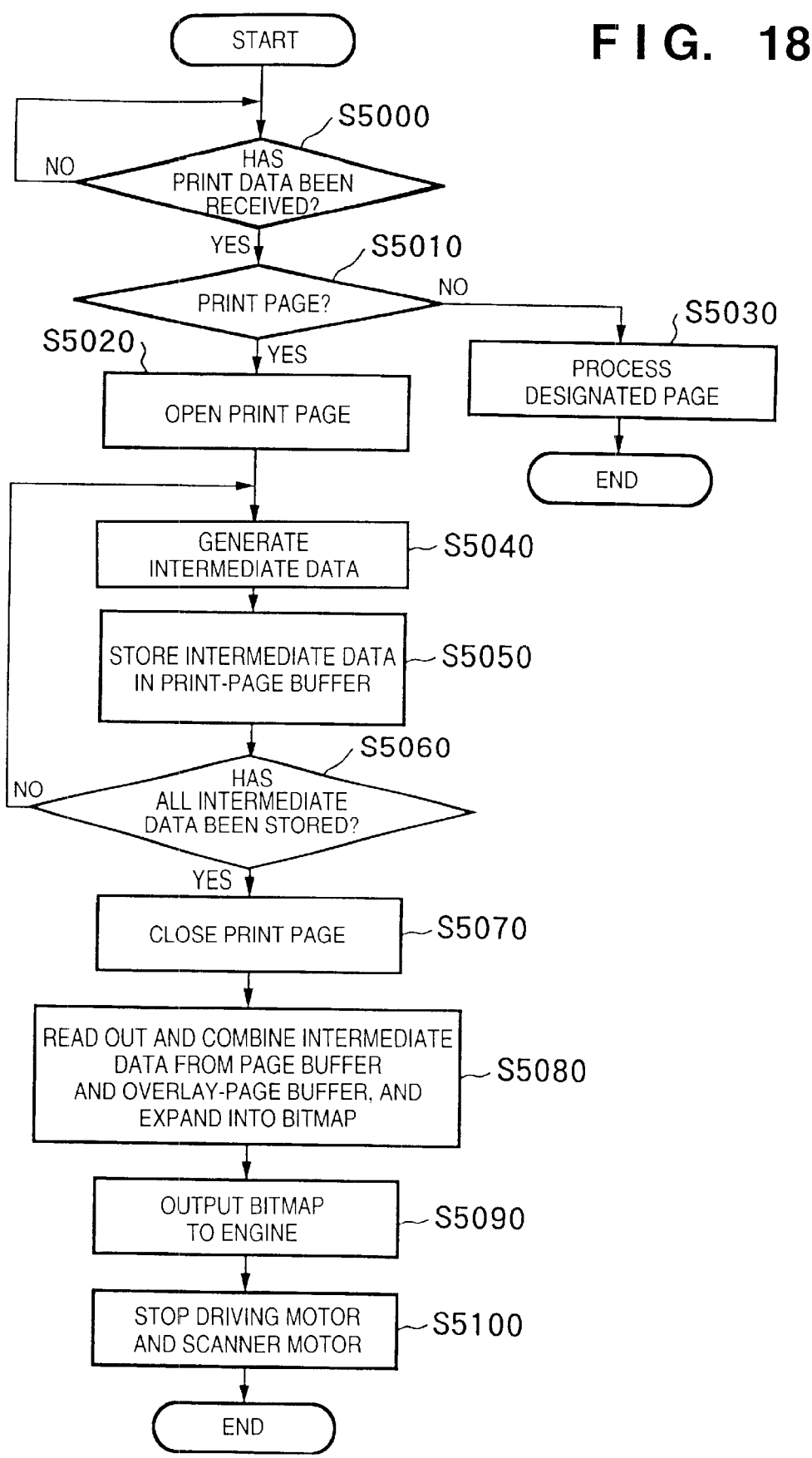
FIG. 18 is a flowchart useful in describing processing executed by the image output apparatus of the fourth embodiment.

In this case, the processing of steps S3050, S3036, S3037 and S3050 in FIG. 14 will be necessary between steps S5060 and S5070 of FIG. 18. It should be noted that if step S3050 is executed, actuation of the driving motor at step S5070 is skipped.

Thus, even in a case where control of a non-print page is performed, preliminary rotation of the scanner is halted and pre-feed is not carried out if there is a change in resolution. As a consequence, rotation of the polygon mirror and feed of paper start anew after resolution is changed and, hence, printing can be performed at a scanner rotational speed that is commensurate with the changed resolution. This makes it unnecessary to provide a limitation upon a change in resolution.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of FIGS. 4 and 5, FIGS. 10 and 11, FIGS. 14 and 15, FIGS. 17, 18 and 5, FIGS. 17, 18 and 11, or FIGS. 17, 18 and 15, which are for performing the functions of the foregoing embodiments, to a system or an apparatus, reading the program codes with a computer (e.g., a CPU or MPU) of the system or apparatus from the storage medium, and then executing the program codes.

In this case, the program codes read from the storage medium implement the novel functions of the embodiment, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

EFFECTS OF THE INVENTION

In accordance with the present invention, as described above, a scanner is rotated preliminarily when a print page is opened. This makes it possible to shorten printing time, especially first-page discharge time. In particular, since a scanner is rotated preliminarily only when a print page is opened, the service life of a polygon scanner is extended.

Further, in a case where page data of a print page waiting to be discharged from the printer exists, preliminary rotation of the scanner is not commanded even when a print page is opened. As a result, a command for wasteful preliminary rotation of the scanner is not issued.

Furthermore, in a case where there is a change in resolution, preliminary rotation of the scanner is stopped and preliminary feed is not carried out. This makes it unnecessary to provide a limitation upon a change in resolution.

Furthermore, in a case where a non-print page has been received, preliminary rotation of the scanner is not carried out even if the non-print page is opened. As a result, needless rotation of the scanner can be prevented and the service life of the polygon scanner can be extended.

As many apparently widely different embodiments of the present invention can be made without departing from the spirit and scope thereof, it is to be understood that the invention is not limited to the specific embodiments thereof except as defined in the appended claims.

What is claimed is:

1. An image output apparatus for outputting an image based on print information, the image output apparatus comprising:
    an image-information development unit for receiving one page of page data generated from the print information and for converting the one page of page data to a video signal;
    a print engine for transporting a print medium in sync with the video signal from said image-information development unit and for forming an image on the print medium using an electrophotographic process by causing scanning of a beam, which is modulated according to the video signal, using a rotatable polygon mirror;
    a command unit for issuing a preliminary-rotation command to cause preliminary rotation of the polygon mirror when generation of the page data starts and for stopping rotation of the polygon mirror;
    a first detector for detecting whether a fixed period of time has elapsed from issuance of the preliminary-rotation command by said command unit; and
    a second detector for detecting whether a print-engine-drive start command has been issued,
        wherein preliminary rotation of the polygon mirror is stopped by said command unit if the fixed period of time has elapsed from issuance of the preliminary-rotation command and the print-engine-drive start command has not been issued.

2. An image output apparatus according to claim 1, further comprising a page-data detector for detecting whether generated page data exists, wherein the preliminary-rotation command is not issued by said command unit if at least one page of page data exists.

3. An image output apparatus according to claim 1, further comprising a determination unit for determining whether the page data is non-print page data, wherein if said determination unit determines that the page data is non-print page data, said command unit does not issue a preliminary-rotation command when generation of the page data starts.

4. An image output apparatus for outputting an image based on print information, the image output apparatus comprising:
    an image-information development unit for receiving one page of page data generated from the print information and for converting the one page of page data to a video signal;
    a print engine for transporting a print medium in sync with the video signal from said image-information development unit and for forming an image on the print medium using an electrophotographic process by causing scanning of a beam, which is modulated according to the video signal, using a rotatable polygon mirror;
    a command unit for issuing a preliminary-rotation command to cause preliminary rotation of the polygon mirror when generation of the page data starts and for stopping rotation of the polygon mirror;
    a changing unit for changing resolution of an image formed by said print engine; and
    a resolution detector for detecting a change in resolution by said changing unit,
        wherein rotation of the polygon mirror is stopped by said command unit in a case where said resolution detector detects a change in resolution by said changing unit.

5. An image output apparatus according to claim 4, further comprising a preliminary-feed command unit for causing advance transport of the print medium prior to printing when the image information has been received from an information processing unit, wherein said preliminary-feed command unit does not cause advance transport of the print medium in a case where said resolution detector detects a change in resolution by said changing unit.

6. An image output apparatus according to claim 4, said changing unit further for changing a transport speed of said print engine.

7. A method for controlling an image output apparatus which outputs an image based on print information using an electrophotographic process and scanning of a beam, which is modulated according to a video signal, using a rotatable polygon mirror, the method comprising the steps of:
    generating one page of page data from the print information;
    issuing a preliminary-rotation command to cause preliminary rotation of the polygon mirror when generation of the page data starts; and
    converting the one page of page data to the video signal and forming the image on a print medium using the electrophotographic process, wherein preliminary rotation of the polygon mirror is stopped if a fixed period of time has elapsed from issuance of the preliminary-rotation command and a print-engine-drive start command has not been issued.

8. A method according to claim 7, further comprising detecting whether generated page data exists, wherein the preliminary-rotation command is not issued if at least one page of page data exists.

9. A method according to claim 7, further comprising determining whether the page data is non-print page data, wherein if it is determined that the page data is non-print page data, the preliminary-rotation command is not issued when generation of the page data starts.

10. A method for controlling an image output apparatus which outputs an image based on print information using an electrophotographic process and scanning of a beam, which is modulated according to a video signal, using a rotatable polygon mirror, the method comprising the steps of:

generating one page of page data from the print information;

issuing a preliminary-rotation command to cause preliminary rotation of the polygon mirror when generation of the page data starts;

converting the one page of page data to the video signal and forming the image on a print medium using the electrophotographic process; and detecting a change in resolution of the image, wherein rotation of the polygon mirror is stopped if a change in resolution of the image is detected.

11. A method according to claim 10, further comprising feeding the print medium up to a print starting position when generation of page data starts in a case where a change in resolution of the image is not detected.

12. A method according to claim 10, further comprising changing a transport speed of the print medium in a case where a change in resolution of the image is detected.

13. A computer-readable storage medium storing a computer program for executing a process for forming and outputting an image based on print information using an electrophotographic process and scanning of a beam, which is modulated according to a video signal, by a rotatable polygon mirror, the process comprising the steps of:

generating one page of page data from the print information;

issuing a preliminary-rotation command to cause preliminary rotation of the polygon mirror when generation of the page data starts; and converting the one page of page data to the video signal and forming the image on a print medium using the electrophotographic process, wherein preliminary rotation of the polygon mirror is stopped if a fixed period of time has elapsed from issuance of the preliminary-rotation command and a print-engine-drive start command has not been issued.

14. A computer-readable storage medium according to claim 13, the process further comprising detecting whether generated page data exists, wherein the preliminary-rotation command is not issued if at least one page of page data exists.

15. A computer-readable storage medium according to claim 13, the process further comprising determining whether the page data is non-print page data, wherein if it is determined that the page data is non-print page data the preliminary-rotation command is not issued when generation of the page data starts.

16. A computer-readable storage medium storing a computer program for executing a process for forming and outputting an image based on print information using an electrophotographic process and scanning of a beam, which is modulated according to a video signal, by a rotatable polygon mirror, the process comprising the steps of:

generating one page of page data from the print information;

issuing a preliminary-rotation command to cause preliminary rotation of the polygon mirror when generation of the page data starts;

converting the one page of page data to the video signal and forming the image on a print medium using the electrophotographic process; and detecting a change in resolution of the image, wherein rotation of the polygon mirror is stopped if a change in resolution of the image is detected.

17. A computer-readable storage medium according to claim 16, the process further comprising feeding the print medium up to a print starting position when generation of page data starts in a case where a change in resolution of the image is not detected.

18. A computer-readable storage medium according to claim 16, the process further comprising changing a transport speed of the print medium in a case where a change in resolution of the image is detected.

* * * * *

UNITED STATES PATENT AND TRADEMARK OFFICE
CERTIFICATE OF CORRECTION

PATENT NO.    : 6,433,812 B1                                                Page 1 of 1
DATED         : August 13, 2002
INVENTOR(S)   : Koichi Honma It is certified that error appears in the above-identified patent and that said Letters Patent is hereby corrected as shown below:

Column 9,
Line 11, "S3035" should read -- S3025 --; and
Line 30, "S3050" should read -- S3040 --.

Column 12,
Line 37, "S3050, S3036, S3037" should read -- S3025, S3026, S3027 --;
Line 38, "S3050" should read -- S3040 --; and
Line 39, "S3050" should read -- S3040 --.

Signed and Sealed this

Twenty-fifth Day of March, 2003

JAMES E. ROGAN
*Director of the United States Patent and Trademark Office*